US007170397B2

(12) United States Patent
Roby et al.

(10) Patent No.: US 7,170,397 B2
(45) Date of Patent: Jan. 30, 2007

(54) METHOD AND APPARATUS FOR WAKING A PERSON

(75) Inventors: Richard J. Roby, Columbia, MD (US); Michael S. Klassen, Columbia, MD (US); Jacqueline DuBois, Ellicott City, MD (US); Glenn Gaines, Fallston, MD (US); Erin Ashley, Elkridge, MD (US)

(73) Assignee: Combustion Science & Engineering, Inc., Columbia, MD (US)

( * ) Notice: Subject to any disclaimer, the term of this patent is extended or adjusted under 35 U.S.C. 154(b) by 0 days.

(21) Appl. No.: 11/293,119

(22) Filed: Dec. 5, 2005

(65) Prior Publication Data

US 2007/0001825 A1 Jan. 4, 2007

Related U.S. Application Data

(60) Provisional application No. 60/632,535, filed on Dec. 3, 2004.

(51) Int. Cl.
*H04B 3/36* (2006.01)

(52) U.S. Cl. ............................... 340/407.1; 340/384.1; 340/628

(58) Field of Classification Search .............. 340/407.1
See application file for complete search history.

(56) References Cited

U.S. PATENT DOCUMENTS

| | | | |
|---|---|---|---|
| 4,220,857 | A | 9/1980 | Bright |
| 4,227,191 | A | 10/1980 | Raber |
| 4,250,500 | A | 2/1981 | Schade |
| 4,260,981 | A | 4/1981 | Yamauchi et al. |
| 4,287,509 | A | 9/1981 | Beggs |
| 4,365,238 | A | 12/1982 | Kollin |
| 4,380,759 | A | 4/1983 | Sulkoski et al. |
| 4,417,235 | A | 11/1983 | Del Grande |
| 4,438,428 | A | 3/1984 | Ober et al. |
| 4,777,474 | A | 10/1988 | Clayton |

(Continued)

FOREIGN PATENT DOCUMENTS

| | | |
|---|---|---|
| WO | WO 00/74013 | 12/2000 |

OTHER PUBLICATIONS

Ahrens, M., "The U.S. Fire Problem Overview Report Leading Causes and Other Patterns and Trends," NFPA Fire Analysis and Research, Jun. 2003.

(Continued)

*Primary Examiner*—Daniel Wu
*Assistant Examiner*—George A. Bugg
(74) *Attorney, Agent, or Firm*—DLA Piper US LLP

(57) ABSTRACT

A system and method for waking a person includes the provision of tactile stimulation in a repeating interrupted pattern upon the detection of an alarm signal indicative of an event for which the person should be awakened. In one embodiment, a device for waking a person comprises a circuit for generating a driver signal in response to an alarm signal, the driver signal having a repeating interrupted pattern; an electrically controlled switching device having a control input, a power input and a power output, the power input being connectable to a power source, the control input being connected to receive the driver signal from the circuit; and a tactile stimulation device connected to the power output of the electrically controlled switching device, the tactile stimulation device being configured to produce a tactile stimulation.

25 Claims, 5 Drawing Sheets

U.S. PATENT DOCUMENTS

| | | | |
|---|---|---|---|
| 4,853,674 | A | 8/1989 | Kiss |
| 4,956,866 | A | 9/1990 | Bernstein et al. |
| 5,012,223 | A | 4/1991 | Griebell et al. |
| 5,287,411 | A | 2/1994 | Hill et al. |
| 5,651,070 | A | 7/1997 | Blunt |
| 5,666,331 | A | 9/1997 | Kollin |
| 5,686,884 | A | 11/1997 | Larkin |
| 5,691,703 | A | 11/1997 | Roby et al. |
| 5,790,050 | A | 8/1998 | Parker |
| 5,867,105 | A | 2/1999 | Hajel |
| 5,889,468 | A | 3/1999 | Banga |
| 5,898,369 | A | 4/1999 | Godwin |
| 5,917,420 | A | 6/1999 | Gonzalez |
| 5,990,797 | A | 11/1999 | Zlotchenko et al. |
| 5,999,089 | A | 12/1999 | Carlson |
| 6,087,960 | A | 7/2000 | Kyouno et al. |
| 6,094,134 | A | 7/2000 | Cohen |
| 6,384,724 | B1 | 5/2002 | Landais |
| 6,420,973 | B2 | 7/2002 | Acevedo |
| 6,764,451 | B2 | 7/2004 | Holland et al. |
| 7,015,807 | B2 | 3/2006 | Roby et al. |
| 2002/0024424 | A1* | 2/2002 | Burns et al. ........... 340/310.01 |
| 2004/0145467 | A1* | 7/2004 | Roby et al. ................. 340/531 |
| 2006/0017561 | A1* | 1/2006 | Albert ........................ 340/531 |

OTHER PUBLICATIONS

Lucas, J., et al., "Summary Health Statistics for U.S. Adults: National Health Interview Survey, 2001," Vital and Health Statistics, Series 10, No. 218, Jan. 2004.

"Low-Power CMOs Ionization Smoke Detector IC with Interconnected and Temporal Horn Driver," Freescale Semiconductor, Inc., <http://www.freescale.com/files/sensors/doc/data_sheetMC145018.pdf> May 2005.

* cited by examiner

METHOD AND APPARATUS FOR WAKING A PERSON

CROSS REFERENCE TO RELATED APPLICATIONS

This application claims priority under 35 U.S.C. § 119(e) to U.S. Provisional Application Ser. No. 60/632,535, filed Dec. 3, 2004, the entire contents of which are incorporated herein by reference.

BACKGROUND

During a fire, the occupants of a building may only have a few minutes to escape without harm. Due to the potentially small escape time, it is imperative to give ample warning to the occupants of a burning building. Most devices sold by the fire safety industry rely on audible alarms to alert the occupants in a residential building. Unfortunately, these devices do not help the hearing impaired. Thus, a need arises for a device that provides ample protection for the hearing-impaired in case of a fire emergency.

When it comes to meeting the general public's need for adequate fire emergency notification devices, one is forced to consider whether the standard off-the-shelf audible smoke detector provides the most appropriate stimulus to prompt a person to begin the egress process. It is estimated that 17% of Americans over the age of 18 have some form of hearing loss (35 million people), and over 3% of those people are severely hearing impaired or profoundly deaf [Lucas, 2004]. Hence, a large number of Americans are at a disadvantage for receiving notification of a fire in their residence by the standard audible smoke detector, and the number of people around the world at this disadvantage is even larger.

Waking persons from sleep is of significant importance because the majority of fire deaths in residential settings occur between the sleeping hours of 11:00 pm and 6:00 am. Although only 20% of fires are reported to have taken place during this temporal window, nearly 50% of fire fatalities occur during this time [Ahrens, 2003].

Recent legislation, such as the Americans with Disabilities Act (ADA), has recognized the disadvantage that deaf and hard-of-hearing people have concerning notification by audible fire alarms. As a result, many automatic fire detection systems are now required to signify with an audible alert accompanied by a strobe to provide a visual indication of fire alarm activation.

Known in the art are devices that use visual signals to alert the hearing-impaired of a fire emergency. Examples of such devices are described in U.S. Pat. Nos. 4,227,191 and 4,287,509. These devices combine a detector and a visual alarm in a single device. Another visual warning device is disclosed in U.S. Pat. No. 5,012,223. This device detects the sound from a remote smoke detector and activates a light in response thereto. Visual alarm devices such as these suffer from the serious drawback of being largely ineffective in alerting a hearing-impaired individual who is asleep.

Systems combining tactile stimulation (e.g., vibrators and bed shakers) have been proposed to address this need. One such device is described in U.S. Pat. No. 4,380,759. This device includes a vibration sensor that is placed next to a smoke detector. When the smoke detector activates, the vibration from the audible alarm triggers a vibrating reed that causes a mild sensation on the skin. Devices such as this are cumbersome to use (especially when the device will only be used at a location temporarily, as in a hotel room) as the user must place the transmitting unit in physical contact with the smoke detector, which is often on a ceiling or otherwise difficult to reach. Other devices for the hearing impaired (e.g., the device disclosed in U.S. Pat. No. 5,917,420) involve the transmission of signals from a detector to a furniture shaker or other tactile stimulation device. Devices such as these are usually quite expensive and require special hardware. U.S. Pat. No. 5,651,070 describes a warning device that "listens" for sounds made by devices such as doorbells and smoke detectors and activates a tactile stimulation device in the form of a wrist-watch. This device records a desired audio alarm and continually compares the recorded alarm to ambient sounds picked up from a microphone. This device is burdensome to use in that it requires the user to record the desired sound prior to use. This can be a problem, for example, when a person enters a hotel room late at night because activation of the smoke detector alarm for the purpose of making the recording may disturb other guests.

To address the above-discussed problems with devices such as these, the assignee of the present application has proposed a system described in co-pending U.S. patent application Ser. No. 10/676,779, filed Oct. 2, 2003 and entitled "Method and Apparatus of for Indicating Activation of a Smoke Detector Alarm," the contents of which are hereby incorporated by reference herein. This system detects a temporal pattern associated with an audible smoke alarm and, upon detection, activates a tactile device such as a bed shaker to wake a person.

While this system has proven very effective, testing of the system with a standard, constantly vibrating bed shaker as the tactile device has revealed that the system was effective in only 76% of the hard of hearing subjects and in only approximately 92% of the deaf subjects. In contrast, hearing able subjects awoke to the bed shaker with constant vibration close to 95% of the time. The lack of response of the hard of hearing and deaf subjects may be due to their conditioned response to the bed shaker as a non-emergency alarm.

The standard audible smoke detector, the emergency alerting system recommended by the fire community, was proven to be effective in awakening 58% of the hard of hearing population and 0% of the deaf subjects. The weighted average effectiveness per hearing level for the U.S. population was found to be 84%. The visual alerting device which is the recommendation by the fire safety community for the hearing impaired population was found to be effective only 35% of the time for the hearing impaired and 60% for the deaf subjects. The visual alerting device had an effective awakening of less than 35% for the hearing able population and a weighted average effectiveness across all hearing levels of 35%. Although the results reported above are over a small statistical sample, they are nonetheless believed to be representative of the results that would be obtained over a larger sample.

The standard audible smoke detector, which is installed in most homes throughout the United States, was found to be only 84% effective across all hearing populations when weighted across the US population on the basis of hearing ability. This means that of the 204 million Americans over 18, thirty-two million might not awaken to the standard audible detector. Many smoke detector manufacturers have already come to accept this reality and now include a statement in their mounting instructions pertaining to the fact that a properly powered activated audible alarm may not be able to awaken a sleeper even when installed to meet the 85 dB at 10 feet or 15 db above ambient NFPA 72 requirements.

A low frequency audible horn, 400–500 Hz and approximately 85 dB, was tested with thirty-six persons of varying hearing ability. Of the five subjects with no hearing loss, all were awakened by the low frequency audible horn. Of the partially hearing subjects, 92% were awakening by the low frequency horn, 35% more frequently than with the standard audible horn. Of the fully deaf subjects, 11% awoke to the low frequency horn. The low frequency horn effectively awakened a larger percentage of subjects, regardless of hearing ability, than the standard audible horn.

What is needed is a more effective method of waking deaf and hard of hearing subjects.

SUMMARY

The aforementioned issues are met to a great extent by a system including a tactile stimulation device that provides non-constant tactile stimulation in order to awaken a person. Preferably, the tactile stimulation provided by the tactile stimulation device follows the same temporal pattern as the audible alarm in smoke/fire detectors manufactured after 1996, which is set forth in National Fire Protection Association standard NFPA 72. The tactile stimulation device is a bed shaker in preferred embodiments.

The tactile stimulation device may be used to wake a person for any reason. In one embodiment, the tactile stimulation device may be connected to a smoke/fire detector or a carbon monoxide detector. In another embodiment, the tactile stimulation device is connected to a device described in the above-referenced commonly owned co-pending U.S. patent application that detects an audible alarm from a smoke detector. In yet another embodiment, the tactile stimulation device may be connected to an alarm clock to wake a person at a desired time. In still another embodiment, the tactile stimulation device may be connected to a door bell or a telephone.

The tactile device may be coupled with a light (preferably an LED) which decreases and increases in intensity with the same T-3 pattern as the vibratory portion of the device. Although the light dims during periods corresponding to the "off" portions of the T3 pattern, the light maintains sufficient light intensity to allow for the recognition of an egress path from the room in which the device was placed. In another embodiment, two lights are provided. The first light activates in a T-3 pattern at the time at which the tactile device is active, and the second light maintains a steady intensity to aid in the egress process.

The tactile device may also be coupled with a device that produces a low frequency sound. The low frequency sound has been shown to effectively waken those with hearing loss in the higher frequencies. The low frequency sound preferably has a frequency below 1500 Hz, more preferably in the range of 300 Hz–600 Hz, and most preferably in the range of approximately 400–500 Hz and replicates the T-3 pattern of the tactile device.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings of preferred embodiments, wherein.

DETAILED DESCRIPTION

The present invention will be discussed with reference to preferred embodiments of tactile stimulation devices. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Figure 1:
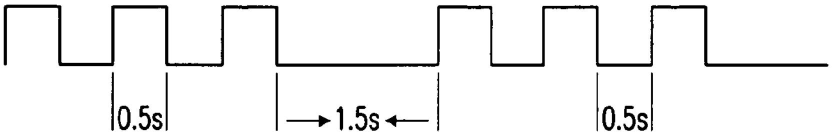
FIG. 1 is a timing diagram showing the audible alarm pattern for smoke detectors set forth in National Fire Protection Association standard NFPA 72.

As discussed above, the inventors have discovered that a constantly vibrating tactile stimulation device is less than optimal for waking persons, particularly hearing impaired or deaf persons, from sleep. As a result, it has been determined that use of a tactile stimulation device in a non-continuous manner is better suited for waking persons from sleep. The National Fire Protection Association standard NFPA 72 mandates that smoke detectors emit audible alarm signals with a repeating temporal pattern shown in FIG. 1 (FIG. 1 illustrates two repetitions of the repeating temporal pattern). This pattern, also referred to herein as a T-3 pattern, may be described as consisting of three short "on" periods, each of which is separated by a short "off" period, followed by a longer "off" period. The length of the short on and off periods is specified as 0.5 seconds "on"+/−10% followed by 0.5 seconds "off" +/−10%. The long "off" period is specified as 1.5 seconds +/−10%. Alternatively, the above-described T3 pattern may be described as consisting of an uneven number of "on" and "off" periods of equal half-second (+/−10%) duration; i.e., a first "on" period, a first "off" period, a second "on" period, a second "off" period, a third "on" period, and three consecutive "off" periods.

In response to the lack of effectiveness of the audible smoke detector and relative positive response to the bed shaker, a new device was introduced into test series. In this device, a bed shaker vibrates in accordance with the T-3 pattern. That is, the bed shaker vibrates during the portions of the T-3 pattern that are "high" or "on" and does not vibrate during the portions of the T-3 pattern that are "low" or "off." The tactile device was tested on 60 subjects of various hearing levels. Every subject regardless of hearing level awoke to the device.

Figure 2:
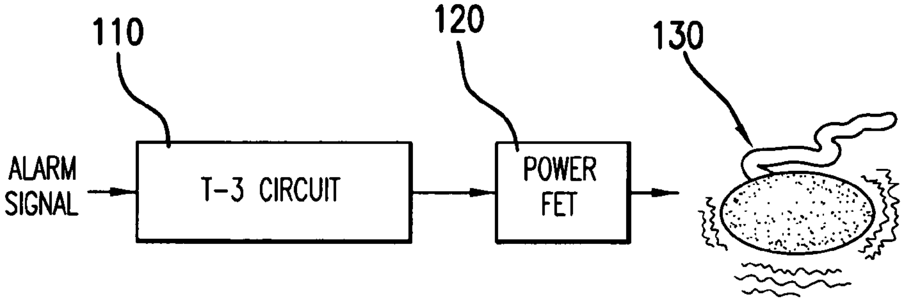
FIG. 2 is a block diagram of a system for waking a person according to one embodiment of the present invention.

A block diagram of the T-3 pattern bed shaker system is illustrated in FIG. 2. An alarm signal from a smoke detector (not shown in FIG. 2) or other device is input to a T-3 circuit 110. When the alarm signal is present, the T-3 circuit outputs a signal matching the T-3 temporal pattern illustrated in FIG. 1. This output signal from the T3 circuit controls a power field effect transistor (FET) 120 (or other switching device, such as a relay) such that power is applied to a bed shaker 130 when the output signal from the T-3 circuit 110 is "high." In this manner, the bed shaker 130 vibrates when the T-3 temporal pattern is "high" and does not vibrate when the T-3 temporal pattern is low.

Figure 3:
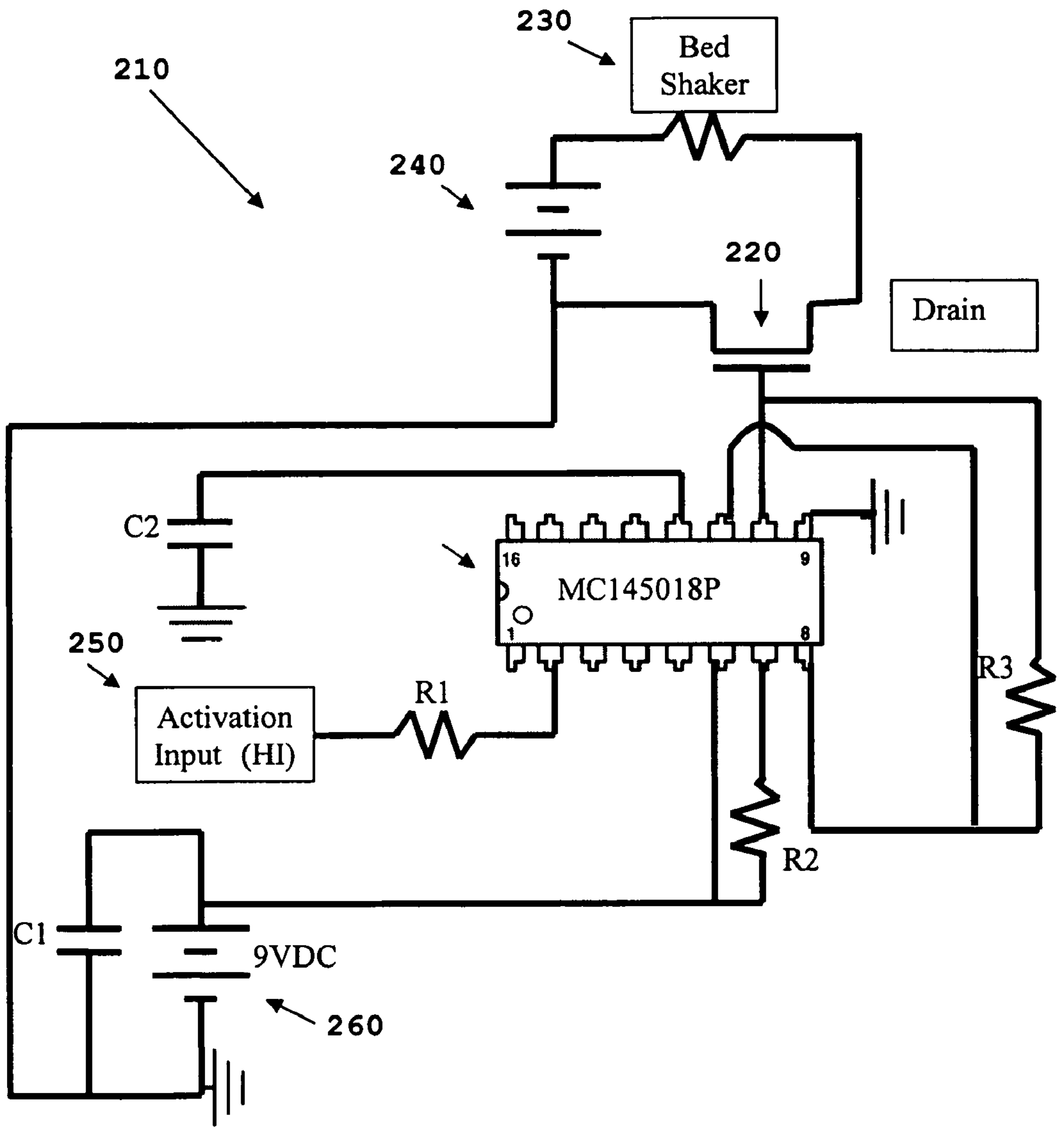
FIG. 3 is a circuit diagram of a portion of the tactile stimulation device of FIG. 2.

A detailed circuit diagram of a preferred embodiment of the system of FIG. 2 is illustrated in FIG. 3. A bed shaker 230 is connected between the positive terminal of a power supply 240 and the drain of a power FET 220. The source of the power FET 220 is connected to the negative terminal of the power supply 240. With this arrangement, a circuit is formed through the power FET 220 such that power is supplied to the bed shaker 230 when a sufficiently positive signal is applied to the gate of the power FET 220.

The gate of the power FET 220 is controlled by the "brass" output (pin 10) of a Motorola/Freescale MC145018 ionization smoke detector integrated circuit, which is typically used to drive a horn. This MC145018 IC 211 is described in data sheet MC145018/D (available at www-.freescale.com/files/sensors/doc/data_sheetMC145018.pdf), the contents of which are hereby incorporated by reference herein. Normally, the horn driver output signal on pin 10 is a high frequency square wave during the "on" portions of the T-3 pattern. However, by feeding back the "silver" output on pin 11 and the output signal itself from pin 10 (via R3) to the feedback input on pin 8, the output signal on pin 10 is held to a constant "on" state during the "on" portions of the T3 pattern.

In the circuit 210 of FIG. 3, an activation input 250 from a smoke detector or other device is connected to pin 2, which is the "I/O" pin of the MC145018 IC 211. This pin is normally used to interconnect several units so that a smoke detection in one unit will trigger an alarm in all units. Of course, it is also possible to use the MC145018 IC 211 itself for the smoke detection function. The remaining connections to the MC145018 IC 211 shown in FIG. 3 are straightforward. Power to the IC is supplied at pin 6 from power source 260, and the IC 211 is grounded at pin 9. A timing resistor R2 (8.2 MΩrecommended) and a timing capacitor C1 (0.1 μF recommended) are connected to pin 7. Finally, pin 12 is connected to a capacitor C2 (also 0.1 μF recommended).

As discussed above, the activation input signal 250 is preferably generated by a smoke/fire detector. However, the invention is not so limited and the other devices such as carbon monoxide detectors, alarm clocks, doorbells, telephones, etc., may also be used as the source of the activation input signal 250. The invention may also be used with the device disclosed in the above-referenced commonly owned U.S. patent application, which detects the audible alarm from a smoke detector.

Figure 4:
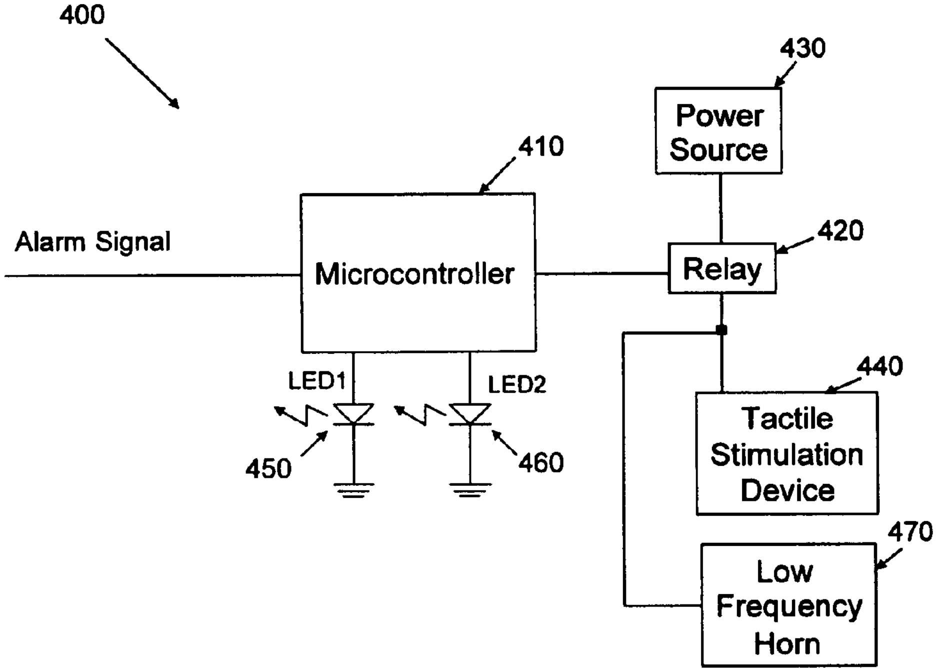
FIG. 4 is a block diagram of a system for waking a person according to another embodiment of the invention.

A block diagram of another embodiment 400 is illustrated in FIG. 4. This embodiment is controlled by a microcontroller 410. The microcontroller 410 receives an alarm signal input from a device such as a smoke detector, a circuit for detecting an audible alarm from a smoke/fire detector such as that disclosed in the above-referenced commonly owned U.S. patent application, a doorbell, a telephone, or any other device (not shown in FIG. 4). The alarm signal is preferably continuously asserted while the alarm condition exists. In other words, in the case of a smoke/fire detector, the alarm signal is continuously asserted while smoke or fire is detected rather than only being asserted when an audible alarm signal is generated. In the case of a telephone, the alarm signal is continuously asserted while the phone is ringing, including the periods between the rings. In the case of a doorbell, the alarm signal is continuously asserted while the doorbell is ringing.

The microcontroller 410 is connected to control a relay 420, which is connected between a power source 430 and a tactile stimulation device 440. This allows microcontroller 410 to turn the tactile stimulation device 440 on and off. Electrically controlled switching devices (e.g., transistors) other than the relay 420 may be used in other embodiments. A first light emitting diode ("LED") 450 and a second light emitting diode 460 are also connected to the microcontroller 410. The first LED 450 is constantly lit while the alarm signal is asserted in order to provide light for egress from a room or to assist a user in taking other action (e.g., answering a telephone, locating a light switch, etc.). Those of skill will recognize that other types of lights could be used in place of the LEDs and that, depending upon the power requirements for the lights, connection via a relay, power transistor or other electrically controlled switching device may be necessary. The second LED 460 is strobed (either on and off or from a bright condition to a dim condition) while the alarm signal is asserted. Preferably, the second LED 460 is strobed in the same T3 pattern in which the tactile stimulation device 440 is activated. A low frequency audible horn 470, preferably approximately 500 Hz, is also connected to the microcontroller 410. The low frequency horn 470 is also preferably activated in the same T3 pattern in which the tactile stimulation device 440 is activated.

Operation of the embodiment 400 will be described with reference to the flowchart 500 of FIG. 5. The microcontroller 410 determines whether an alarm signal is detected at step 510. If no alarm signal is present, the microcontroller repeats step 510 until an alarm signal is detected. When an alarm signal is detected, the microcontroller 410 turns the first LED 450 on at step 520. Next, the microcontroller 410 activates the second LED 460, the low frequency horn 470, and the tactile stimulation device 440 (by controlling the relay 420) in a non-continuous, or interrupted, pattern at step 530. Preferably, the interrupted pattern is the T3 pattern discussed herein. The microcontroller 410 then determines whether the alarm signal is still being asserted at step 540. If the alarm signal is being asserted, the microcontroller 410 jumps to step 530 to continue activation of the second LED 460, the low frequency horn 470, and tactile stimulation device 440 in the non-continuous pattern. If the alarm signal is no longer being asserted, the microcontroller 410 turns the first LED 450 off at step 550 and jumps to step 510.

In the above-mentioned embodiment, the second LED 460 and the tactile stimulation device 440 are always activated for at least one complete period of the non-continuous pattern even if the alarm signal terminates prior to the completion of the non-continuous pattern period. However, in other embodiments, the microcontroller 410 may be programmed to terminate the activation of the second LED 460 and the tactile stimulation device 440 as soon as the alarm signal is no longer asserted. Also, in yet other embodiments of the invention, the microcontroller 410 may be programmed to activate the first and second LEDs 450, 460, the horn 470 and the tactile stimulation device 440 for a predetermined period of time or until a user deactivates the device.

Figure 5:
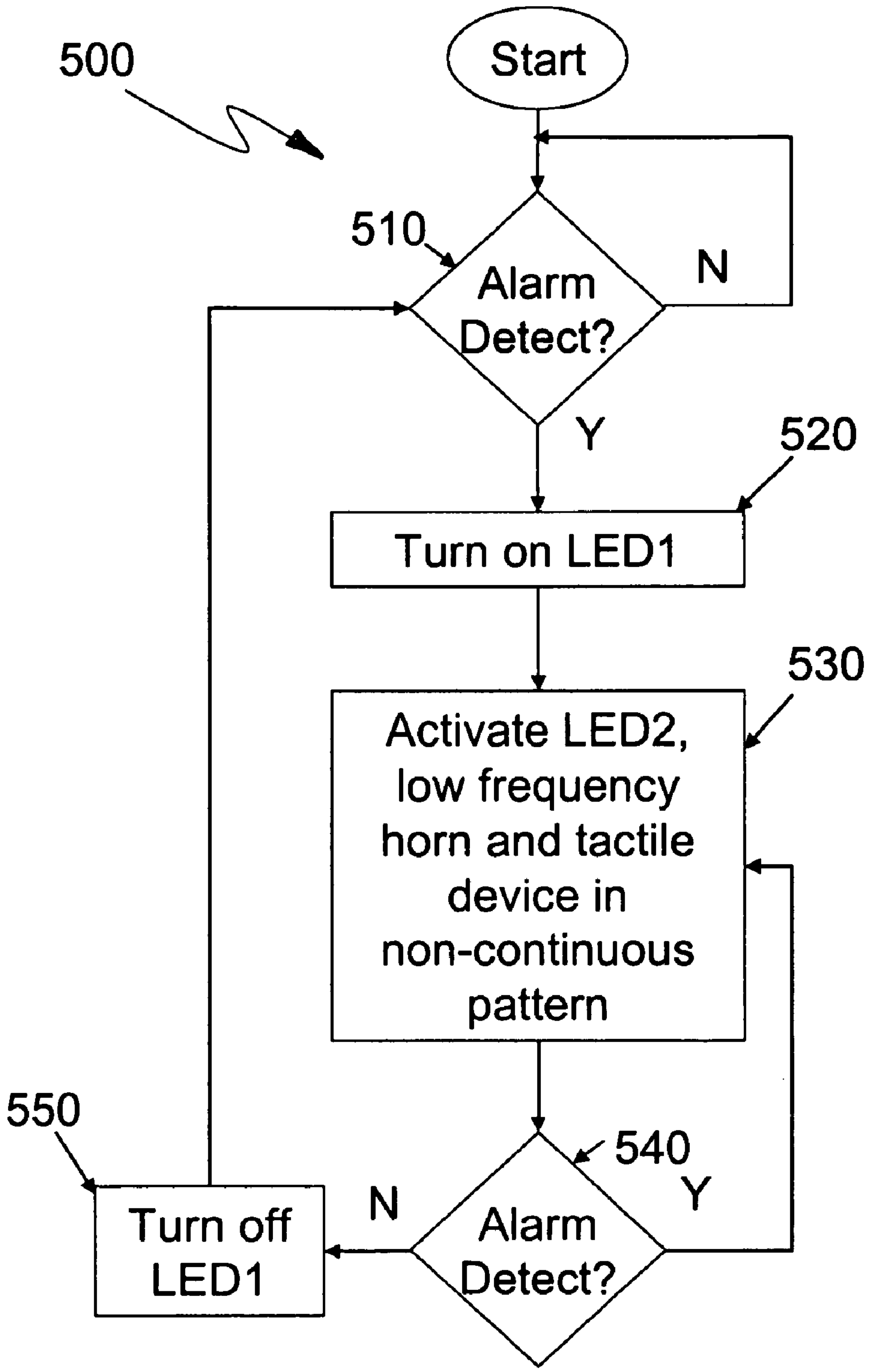
FIG. 5 is a flowchart showing the operation of a microcontroller that forms part of the system of FIG. 4.

As discussed above, an alternative to the two-LED embodiment illustrated in FIGS. 4 and 5 is an embodiment with a single LED. In such an embodiment, the single LED is made bright when the tactile stimulation device is active and made dim (but still bright enough to provide light in order to facilitate egress from the room or other action) when the tactile stimulation device is inactive (e.g., during the "off" periods of the T3 or other non-continuous pattern).

Figure 6:
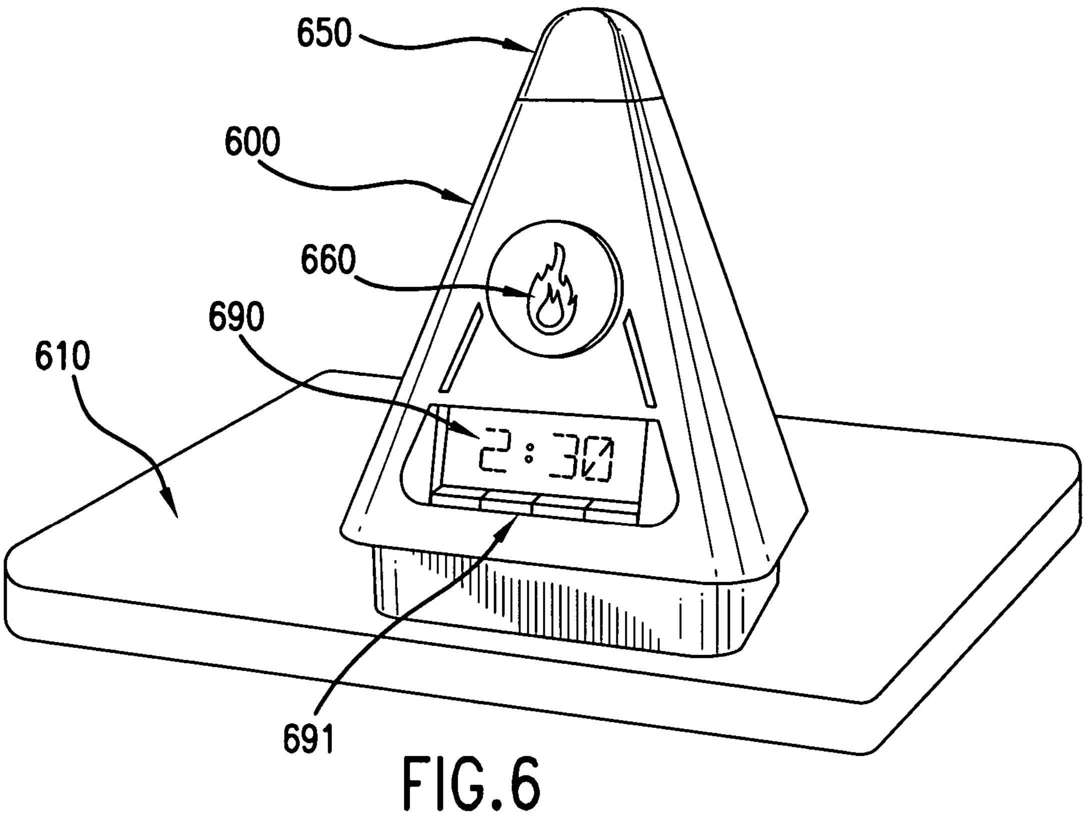
FIG. 6 is a perspective view showing an exemplary housing for a portion of the circuit of the system of FIG. 4.
Figure 7:
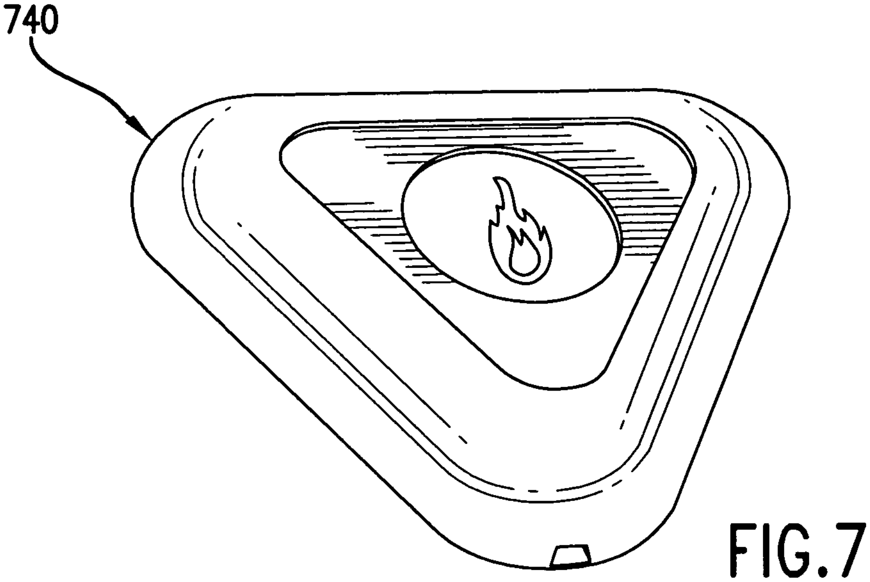
FIG. 7 is a perspective view showing an exemplary housing for a bed shaker according to an embodiment of the invention.

FIGS. 6 and 7 are perspective views of housings 600, 770 in which the embodiment described in FIG. 4 may be enclosed. The housing 600 is preferably sized to be placed on a tabletop 610 such as a nightstand. The microcontroller 410, relay 420, power source 430 and low frequency horn 470 are all located within housing 600. The first led 450 is located beneath plastic covering 650 so as to provide light in all directions for egress. The second LED 460 is located behind the translucent stylized fire symbol 660 (alternatively, the second LED 460 may also be located within housing 650). The housing 600 also includes a clock display 690 and associated control button panel 691 and hence can also serve as an alarm clock in some embodiments. FIG. 7 illustrates a bed shaker housing 770 that is connected to the relay within housing 600 by a power cord (not shown in FIG. 6 or 7).

The above-described embodiments are set forth for illustration purposes only and should not be understood to limit the invention. Many modifications to the above-described embodiments will be readily apparent to those of skill in the art. For example, a tactile stimulation device other than a bed shaker may be utilized. Additionally, switching devices such as relays, solenoids, and other types of switching devices may be used in place of the power FET to control activation of the bed shaker. Audible devices such as a low frequency buzzer may be used in place of the low frequency horn discussed herein. Moreover, other non-continuous or interrupted repeating patterns may be used in place of the T-3 pattern. For example, a repeating temporal pattern consisting of more "on" periods than "off" periods (or, alternatively, short and long "on" periods separated by short "off" periods) can also be used. All such modifications are intended to be within the scope of the invention.

We claim:

1. A device for waking a person, the device comprising:

a circuit for generating a driver signal in response to an alarm signal, the driver signal having a repeating interrupted pattern;

an electrically controlled switching device having a control input, a power input and a power output, the power input being connectable to a power source, the control input being connected to receive the driver signal from the circuit; and a tactile stimulation device connected to the power output of the electrically controlled switching device, the tactile stimulation device being configured to produce a tactile stimulation, whereby a person sensing the tactile stimulation is awakened.

2. The device of claim 1, wherein the electrically controlled switching device is a transistor.

3. The device of claim 1, wherein the electrically controlled switching device is a relay.

4. The device of claim 1, wherein the tactile stimulation device is a bed shaker.

5. The device of claim 1, wherein the circuit comprises a processor.

6. The device of claim 5, wherein the processor is a microcontroller.

7. The device of claim 1, wherein the alarm signal is continuously asserted during an alarm event.

8. The device of claim 1, wherein each repetition of the interrupted pattern includes an uneven number of "on" and "off" periods of equal duration.

9. The device of claim 1, wherein each repetition of the interrupted pattern includes a plurality of "on" and "off" periods.

10. The device of claim 9, wherein at least one "off" period has a duration different from a duration of at least one "on" period.

11. The device of claim 1, wherein the repeating interrupted pattern comprises a plurality of T3 patterns.

12. The device of claim 1, further comprising a low frequency annunciator connected to the electrically controlled switching device, the annunciator producing an audible sound below 1500 Hz.

13. The device of claim 1, further comprising a first light controlled by the driver signal.

14. The device of claim 1, further comprising a second light connected to the circuit, the circuit further being configured to turn on the second light while the alarm signal is asserted.

15. A method for waking a person, the method comprising the steps of:

detecting an alarm signal, the alarm signal signifying an occurrence of an event to which the person is to be notified; and providing a tactile stimulation to the person upon detecting the alarm signal, the tactile stimulation having a repeating interrupted pattern, whereby the person is awakened.

16. The method of claim 15, wherein the tactile stimulation is provided using a bed shaker.

17. The method of claim 15, wherein each repetition of the interrupted pattern includes an uneven number of "on" and "off" periods of equal duration.

18. The method of claim 15, wherein each repetition of the interrupted pattern includes a plurality of "on" and "off" periods.

19. The method of claim 18, wherein at least one "off" period has a duration different from a duration of at least one "on" period.

20. The method of claim 19, wherein at least one "off" period has a duration different from a duration of at least one other "off" period.

21. The method of claim 19, wherein at least one "on" period has a duration different from a duration of at least one other "on" period.

22. The method of claim 15, wherein the repeating interrupted pattern comprises a plurality of T3 patterns.

23. The method of claim 15, further comprising the step of activating a low frequency audible device in an interrupted pattern upon detection of the alarm signal the low frequency audible device producing a sound at a frequency below 1500 Hz.

24. The method of claim 15, further comprising the step of turning on a first light during a period of time in which the alarm signal is being asserted.

25. The method of claim 15, further comprising the step of modifying an intensity of a second light in a repeating interrupted pattern during a period of time in which the alarm signal is being asserted.

* * * * *